(12) United States Patent
Maeda (10) Patent No.: US 7,688,360 B2
(45) Date of Patent: Mar. 30, 2010

(54) IMAGING APPARATUS CONTROL UNIT AND DIGITAL CAMERA

(75) Inventor: Hirokazu Maeda, Saitama (JP)

(73) Assignee: Hoya Corporation, Tokyo (JP)

( * ) Notice: Subject to any disclaimer, the term of this patent is extended or adjusted under 35 U.S.C. 154(b) by 425 days.

(21) Appl. No.: 11/677,222

(22) Filed: Feb. 21, 2007

(65) Prior Publication Data

US 2007/0196101 A1   Aug. 23, 2007

(30) Foreign Application Priority Data

Feb. 22, 2006   (JP) .............................. 2006-045179

(51) Int. Cl.
*H04N 5/76* (2006.01)
*H04N 5/225* (2006.01)
*H04N 7/14* (2006.01)
*H04N 5/00* (2006.01)

(52) U.S. Cl. .............. 348/231.1; 348/231.2; 348/231.6; 348/220.1; 348/14.13; 386/120

(58) Field of Classification Search .............. 348/231.1, 348/231.2, 231.6, 220.1, 14.13
See application file for complete search history.

(56) References Cited

U.S. PATENT DOCUMENTS 5,633,976 A * 5/1997 Ogino ........................ 386/120

| | | | | |
|---|---|---|---|---|
| 2003/0175022 A1* | 9/2003 | Ueyama | | 396/89 |
| 2003/0179302 A1* | 9/2003 | Harada et al. | | 348/231.6 |
| 2005/0088568 A1 | 4/2005 | Uenaka | | |
| 2005/0089322 A1 | 4/2005 | Uenaka | | |
| 2005/0134724 A1 | 6/2005 | Uenaka | | |
| 2007/0058074 A1* | 3/2007 | Yamagishi | | 348/372 |

OTHER PUBLICATIONS

U.S. Appl. No. 11/676,520 to Yamamoto et al., which was filed on Feb. 20, 2007.

* cited by examiner

*Primary Examiner*—Nhan T Tran
*Assistant Examiner*—Quang V Le
(74) *Attorney, Agent, or Firm*—Greenblum & Bernstein P.L.C.

(57) ABSTRACT

An imaging apparatus control unit, comprising a calculation block, a first control block, an output block, and a second control block, is provided. The calculation block calculates the number of possible photographs. The number of possible photographs is set as the sequential-photographing number. The first control block carries out imaging control for either sequential-photographing or single-photographing. The output block outputs the compressed image signal to the memory. The second control block either repeatedly carries out the sequential control for sequential-photographing, or stops carrying out the sequential control for sequential-photographing and begins carrying out the sequential control for single-photographing when the sequential-photographing number is below a first predetermined number.

9 Claims, 11 Drawing Sheets

IMAGING APPARATUS CONTROL UNIT AND DIGITAL CAMERA

BACKGROUND OF THE INVENTION

1. Field of the Invention

The present invention relates to an imaging apparatus control unit that controls operations for ordering an imaging apparatus, such as a digital camera, to carry out automatic sequence photography.

2. Description of the Related Art

A digital camera, which can carry out automatic sequence photography, is known. When automatic sequence photography commences with the depression of a release button, a plurality of sequential photographs are automatically taken, differently from the case of single photography where a single photograph is taken.

Figure 3:
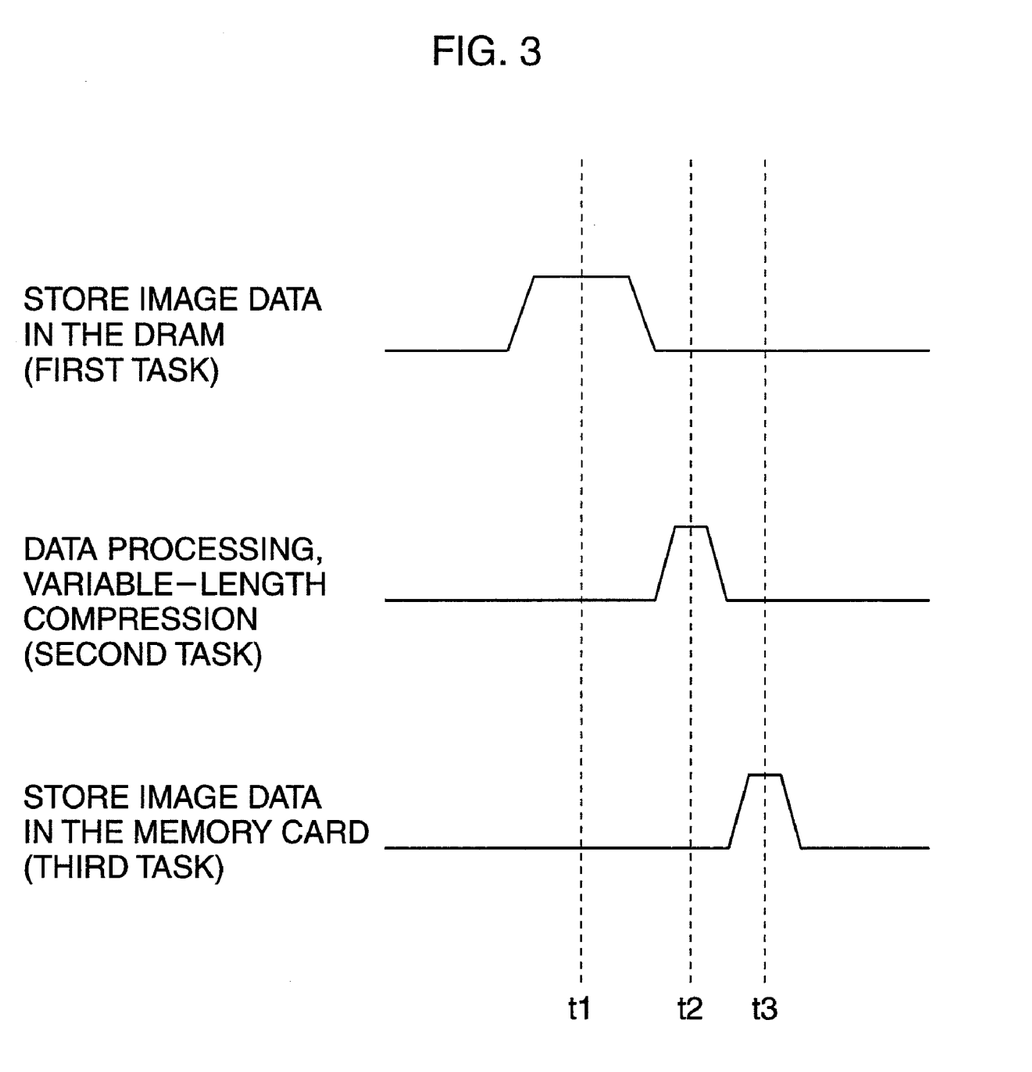
FIG. 3 is a timing chart showing the timing of the a first, second, and third tasks executed in the imaging control for single-photographing.

A photograph is taken in a digital camera by generating an image signal corresponding to the optical image of an object received by an imaging device, carrying out predetermined signal processing on the image signal by a signal processor, and storing the image signal in a memory. As shown in FIG. 3, single photography is completed by storing the singular generated frame of an image signal in a temporary memory, carrying out the predetermined signal processing on the stored image signal, and storing the image signal in the main memory, in order. Incidentally, in the timing chart of FIG. 3, each operation is carried out during a period of a standing pulse. Accordingly, if sequential photographs are taken by a user's repetition of the single photography, one frame of an image signal starts to be generated after the previous frame of an image signal has been stored in the main memory.

Figure 4:
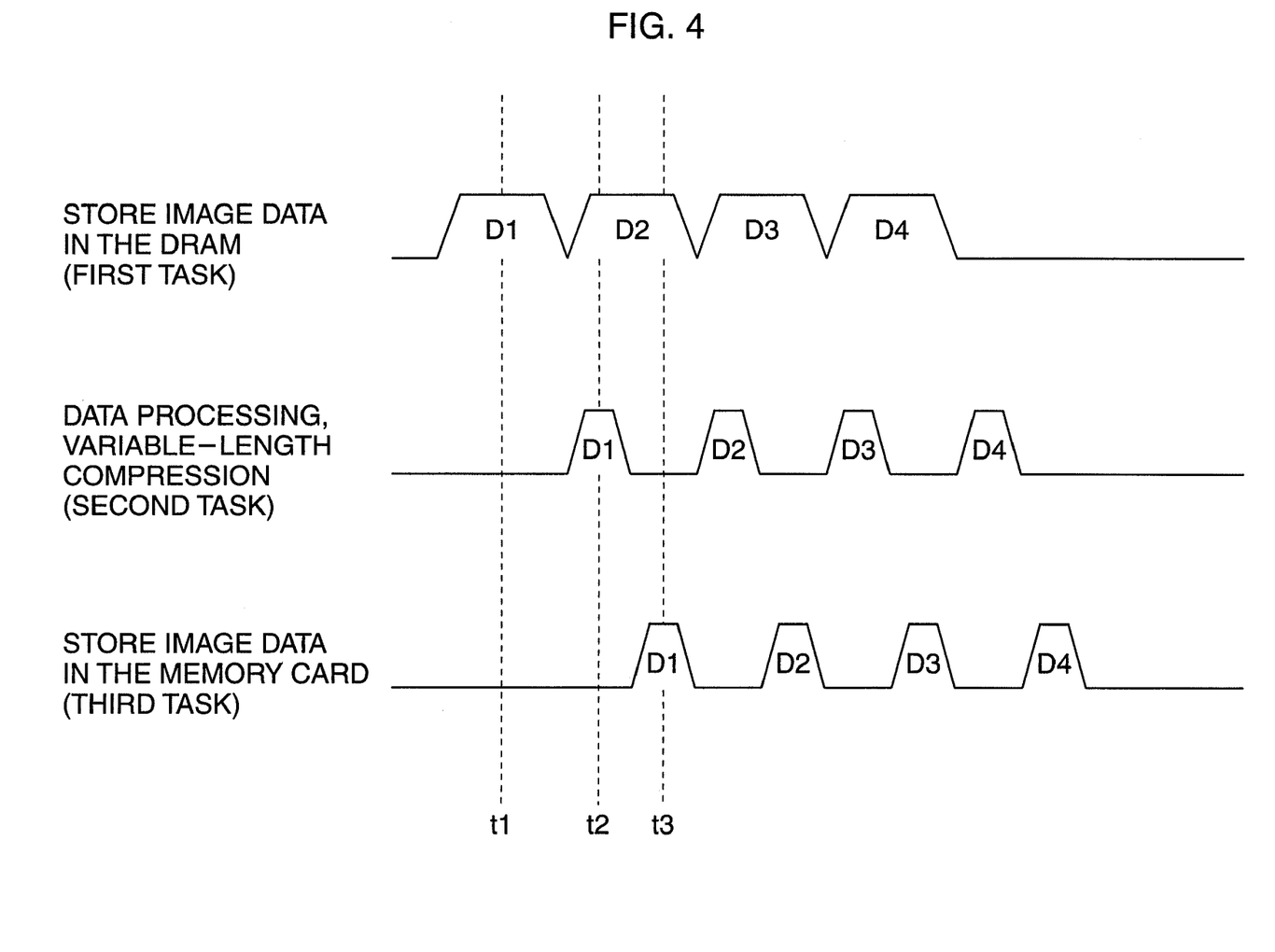
FIG. 4 is a timing chart showing a timing when a first, second, and third tasks executed in the imaging control for sequential-photographing.

On the other hand, if sequential photographs are taken in automatic sequence photography, storing a plurality of frames of the generated image signals to the temporary memory, predetermined signal processing on the stored image signals, and storing the image signals in the main memory is carried out overlappingly, as shown in FIG. 4. For example, first a first image data (see "D1" in FIG. 4) is generated and stored in the temporary memory, next a second image data (see "D2" in FIG. 4) is generated and stored in the temporary memory while the first image data undergoes predetermined signal processing and storage in the main memory. Since then, subsequent image data is generated and stored in the temporary memory while previously generated image data undergoes predetermined signal processing and storage in the main memory. Accordingly, the sequential photographs can be taken quickly by concurrently carrying out a plurality of operations in automatic sequence photography.

In the automatic sequence photography described above, not all of the generated image signals corresponding to sequential photographs can be stored in the main memory once the main memory becomes full. The storage failure is problematic. In addition, the power consumption for driving a shutter, generating an image signal, and undergoing predetermined signal processing is excessive.

On the other hand, it is desired to make use of the spare capacity of the main memory upon the completion of the automatic sequence photography. Consequently, the time until depletion of the spare capacity is estimated, and the generation of the image signal is terminated before the estimated time, thus avoiding the storage failure.

By the way, a raw image signal generated by an imaging device is compressed according to variable-length compression, for example JPEG, because the amount of data required for a raw image signal is large. As for compressing raw image signals of different optical images, data sizes between compressed image signals may vary with each other even if the data required for the raw image signals are the same. The different size requirements result from variation of contrast and spatial frequency in photographed optical images. Consequently, it is impossible to estimate an accurate typical data space required for one frame of an image signal, making it difficult to estimate the time until depletion of the spare capacity of the main memory.

For the above problem, a maximum data size of a compressed image signal is estimated statistically. The maximum data size is determined from the typical data size of one frame of an image signal. When the spare capacity becomes less than the maximum data size, the auto sequence photography is complete. However, the main memory still may have excess capacity after automatic sequence photography, because it is rare that the data size of a practically compressed image signal equals the statistically estimated maximum data size. It is problematic when automatic sequence photography is completed with remaining spare capacity because a user usually desires to take as many photographs as possible in automatic sequence photography.

Further for the above problem, it is suggested that an upper limited data size of an image signal is predetermined. All of the generated image signals are surely stored in the main memory by compressing an image signal, of which data size is under the upper limited data size, with a lower compression ratio and compressing an image signal, of which data size is over the upper limited data size, with a higher compression ratio. However, it is problematic that an image quality gets deteriorated due to compressing with a higher compression ratio.

SUMMARY OF THE INVENTION

Therefore, an object of the present invention is to provide an imaging apparatus control unit and a digital camera capable of carrying out automatic sequence photography that maximizes use of memory capacity without deterioration of image quality.

According to the present invention, a first imaging apparatus control unit, comprising a first detection block, a calculation block, a setting block, a first control block, a compression block, an output block, a second control block, a comparison block, and a second detection block, is provided. The first detection block detects the spare capacity of a memory. The memory stores an image signal. The image signal is generated by an imaging signal when capturing an optical image of an object. The calculation block calculates the number of possible photographs based on the spare capacity and a predetermined data size. The setting block sets the number of possible photographs as the sequential-photographing number. The first control block carries out an imaging control for either sequential-photographing or single-photographing so that the set sequential-photographing number of photographs or a single photograph is taken, respectively. The compression block generates a compressed image signal by compressing the image signal according to the variable-length compression. The image signal is generated according to the imaging control for either sequential-photographing or single-photographing. The output block outputs the compressed image signal to the memory. The second control block carries out sequential control for sequential-photographing or single-photographing. In the sequential control for sequential-photographing, the first detection block, the calculation block, the setting block, the first control block, the compression block and the output block are sequentially ordered to detect the spare capacity, to calculate the number of possible photographs, to set the number of possible photographs as the sequential-photographing number, to carry out the imaging control for sequential-photographing, to generate the compressed image signal, and to output the compressed image signal, respectively. In the sequential control for single-photographing, the first control block, the compression block, and the output block are sequentially ordered to carry out the imaging control for single-photographing, to generate the compressed image signal, and to output the compressed image signal, respectively. The comparison block compares the sequential-photographing number to a first predetermined number. The sequential-photographing number is calculated in the sequential control for sequential-photographing. The second detection block detects whether or not a command for sequence photography is input. The second control block repeatedly carries out the sequential control for sequential-photographing while the second detection block detects the command for sequence photography. The second control block terminates actions of the sequential control for sequential-photographing and initiating actions of the sequential control for single-photographing when the sequential-photographing number is below the first predetermined number.

Further, the second control block repeatedly carries out the sequential control for single-photographing after initially carrying out the sequential control for single-photographing.

Further, the second control block terminates carrying out the sequential control for single-photographing if the number of possible photographs is below a second predetermined number. The number of possible photographs is calculated before carrying out the sequential control for single-photographing.

According to the present invention, a second imaging apparatus control unit, comprising a first control block, a signal processing block, a second control block, a third control block, and a detection block, is provided. The first control block orders an imaging device to capture an optical image of an object. The imaging device generates an image signal upon capture of the optical image. The signal processing block carries out predetermined signal processing. A compressed image signal is generated from the image signal created by the imaging device and compressed during the predetermined signal processing according to variable-length compression. The second control block stores the compressed image signal in a memory. The third control block carries out sequential control for either single-photographing or sequnetial-photographing. The first control block, the signal processing block, and the second control block are sequentially ordered so that generation of the image signal, predetermined signal processing on the image signal, and storage of the compressed image signal in the memory are carried out, in order, in the sequential control for single-photographing. The first control block, the signal processing block, and the second control block are ordered so that at least two of the three acctions which include generation of the image signal, predetermined signal processing on the image signal previously generated by the imaging device, and storage in the memory of the compressed image signal which had previously undergone the predetermined signal processing are carried out simultaneously in the sequential control for sequential-photographing. The detection block detects the spare capacity of the memory. The third control block carrying out the sequential control for sequential-photographing, and initiating actions of the sequential control for single-photographing when detected the spare capacity is less than a predetermined value.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
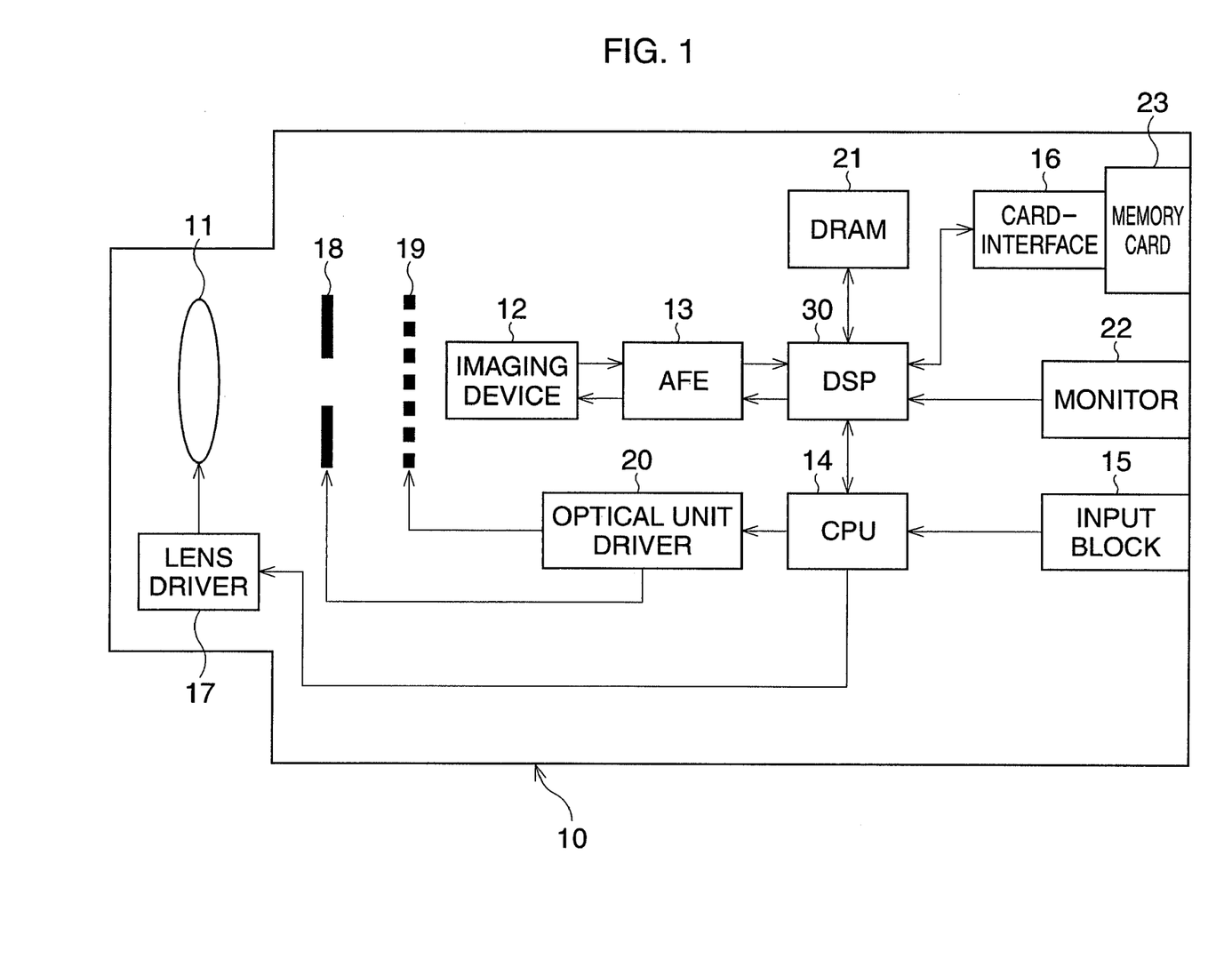
FIG. 1 is a block diagram showing the internal structure of a digital camera having an imaging apparatus control unit of an embodiment of the present invention.

In FIG. 1, a digital camera 10 comprises a photographic optical system 11, an imaging device 12, an analog front end (AFE) 13, a DSP 30, a CPU 14, an input block 15, a card-interface 16, and other components.

The photographic optical system 11 comprises plural lenses, including a focus lens (not depicted) and a zoom lens (not depicted). The focus lens and the zoom lens are movable along an optical axis of the photographic optical system 11. An optical image of an object can be focused on the light-receiving surface of the imaging device 12 by moving the focus lens. A focal length of the photographic optical system 11 is adjusted by moving the zoom lens. A lens driver 17 drives the movements of the focus lens and the zoom lens.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates a raw image signal corresponding to the captured optical image.

A diaphragm 18 and a shutter 19 are mounted between the photographic optical system 11 and the imaging device 12. The intensity of light made incident on the light-receiving surface of the imaging device 12, is adjustable by adjusting the aperture ratio of the diaphragm 18. An optical image reaches the light-receiving surface by opening the shutter 19, and an optical image is shielded from the light-receiving surface by closing the shutter 19. An optical unit driver 20 drives the diaphragm 18 and the shutter so that the aperture ratio can be adjusted and the shutter can be opened and closed.

The imaging device 12 is electrically connected to the DSP 30 via the AFE 13. A clock signal is sent from the DSP 14 to the AFE 13. The AFE 13 generates a frame signal and an imaging device driving signal based on the received clock signal. The imaging device driving signal is sent to the imaging device 12. The imaging device 12 is driven based on the imaging device driving signal, and the imaging device 12 generates a raw image signal that is synchronized with the frame signal.

The generated raw image signal is sent to the AFE 13. The AFE 13 carries out correlated double sampling, and gain adjustment on the raw image signal. In addition, the raw image signal is converted into raw image data, which is digital data. The raw image data is sent to the DSP 30.

The DSP 30 is connected to a dynamic random access memory (DRAM) 21. The raw image data received by the DSP 30 is temporarily stored in the DRAM 21. The DSP 30 carries out predetermined data processing, such as white balance processing, color interpolation processing, and edge enhancement processing, on the raw image data stored in the DRAM 21. In addition, the raw image data, having undergone predetermined data processing, is compressed according to JPEG variable-length compression.

The DSP 30 is connected to the card-interface 16 which can be connected to a memory card 23. When a photograph is taken, the compressed image data is stored in the memory card 23.

The DSP 30 is connected to the monitor 22. An image, corresponding to the compressed image data stored in the memory card 23, can be displayed on the monitor 22.

The DSP 30 is connected to the CPU 14. The CPU 14 controls the DSP 30 to output the clock signal, to carry out predetermined data processing on the raw image data, to store the compressed image data in the memory card 23, and to display the compressed image data on the monitor 22.

Incidentally, the optical unit driver 20 and the lens driver 17 are connected to the CPU 14. The CPU 14 controls the operations of the optical unit driver 20 and the lens driver 17

The CPU 14 is connected to the input block 15 where a user inputs operational commands for handling the digital camera 10. The input block 15 comprises a release button (not depicted), a multi-functional cross-key (not depicted), a switching button (not depicted), and other buttons.

By depressing the release button halfway, exposure adjustment and focusing operation are carried out. In the exposure adjustment, the aperture ratio of the diaphragm 18, a shutter speed, and a gain by which to multiply the raw image data in the DSP 30 are adjusted. Additionally in the focusing operation, the focus lens is moved. Further, by fully depressing the release button, operations for taking a photograph, such as opening and closing the shutter 19, capturing an optical image by the imaging device 12, and storing the compressed image data in the memory card 23, are carried out.

By a user's input to the multi-functional cross-key, an image quality is selected from a plurality of predetermined quality levels. For example, when a high quality level is selected, raw image data converted from the raw image signal generated by the imaging device 12 is compressed with a low compression ratio. The raw image data is converted into compressed image data corresponding to an image of high quality. On the other hand, when a low quality level is selected, the raw image data is compressed with higher compression ratio and converted into compressed image data corresponding to an image of low quality.

The digital camera 10 has both a single-photographing and sequence-photographing mode. In the single-photographing mode, a single photograph is taken by fully-depressing a release button. In the sequence-photographing mode, a plurality of sequential photographs are taken automatically upon fully-depressing the release button. By depressing the switching button, the mode of the digital camera 10 is changed between the single-photographing mode and the sequence-photographing mode.

In the single-photographing mode, each component of the digital camera 10 is controlled according to a sequential control for single-photographing, which will be described later in detail. On the other hand, in the sequential-photographing mode, each component of the digital camera 10 is controlled according to sequential controls for both sequential-photographing and single-photographing, which will be described later in detail. The sequential controls for both sequential-photographing and single-photographing include respective imaging controls. The imaging device 12 and a process block 31 (see FIG. 2) comprised in the DSP 30 are controlled according to imaging controls for either sequential-photographing or single-photographing. According to the imaging control for sequential-photographing, the imaging device sequentially generates the set sequential-photographing number of frames of a raw image signal, the set sequential-photographing number of frames of raw image data corresponding to the set sequential-photographing number of frames of the raw image signal undergoes sequential-photographing data processing, and the set sequential-photographing number of frames of the compressed image data is stored in the memory card 23. According to the imaging control for single-photographing, the imaging device generates one frame of a raw image signal, one frame of raw image data corresponding to one frame of the raw image signal undergoes single-photographing data processing, and one frame of the compressed image data is stored in the memory card 23.

Figure 2:
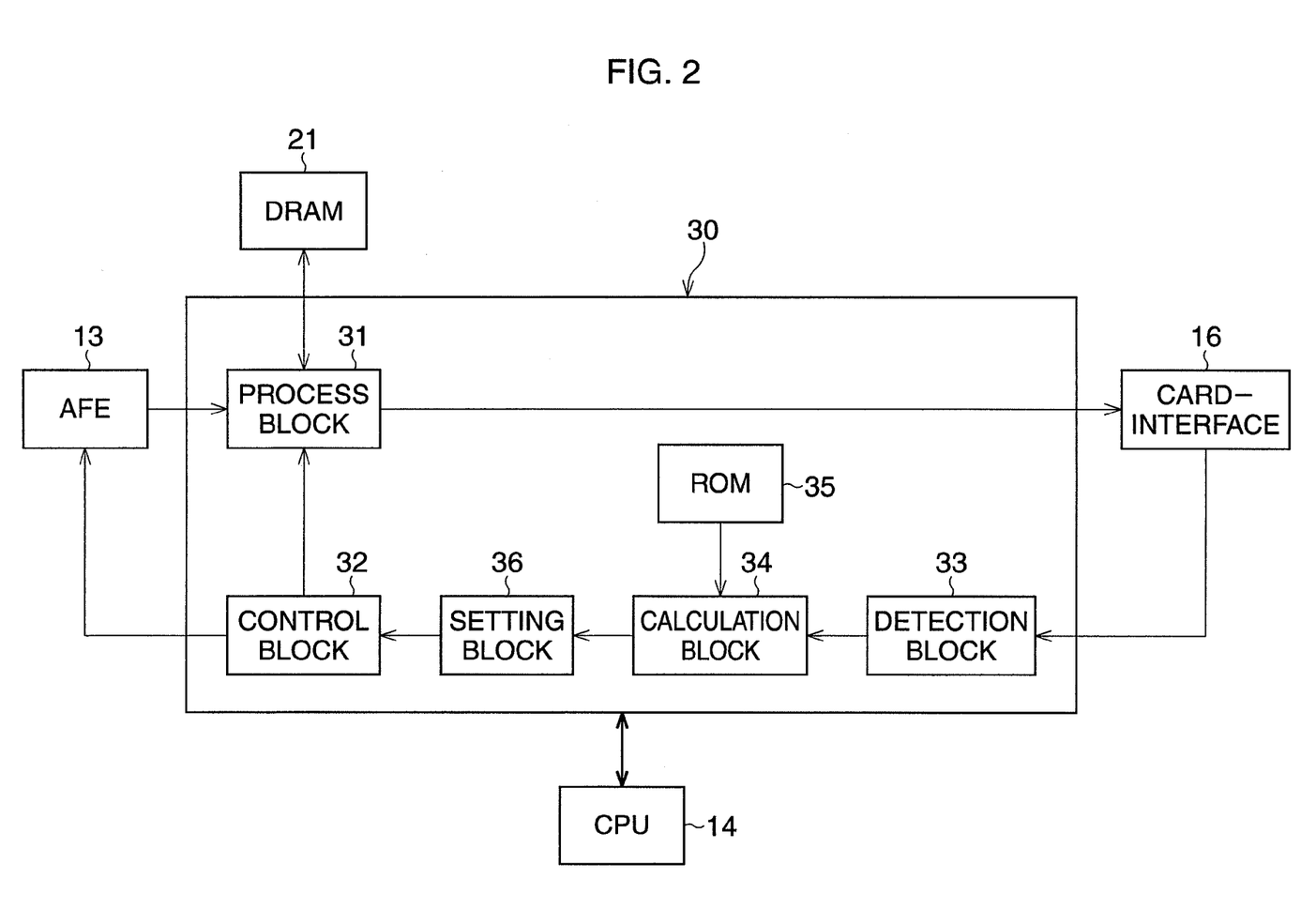
FIG. 2 is a block diagram showing the internal structure of the DSP.

Next, an internal structure of the DSP 30 is explained in detail below with reference to FIG. 2. The DSP 30 comprises the process block 31, a control block 32, a detection block 33, a calculation block 34, ROM 35, a setting block 36, and other components.

The raw image data sent from the AFE 13 to the DSP 30 is input to the process block 31. The process block 31 stores the raw image data in the DRAM 21 and carries out the predetermined data processing. The compressed image data, having undergone the predetermined data processing, is then sent to the memory card 23 from the process block 31 via the card-interface 16.

The detection block 33 detects the amount of spare capacity of the memory card 23; detected spare capacity data is sent to the calculation block 34. The calculation block 34 calculates the number of possible photographs. The number of possible photographs is calculated by dividing the spare capacity by a predetermined data size. The predetermined data size is the estimated average amount of data required for one frame of compressed image data generated by photographing a general object in general conditions. A plurality of predetermined data sizes are decided for different image qualities and stored in the ROM 35. Data indicating the number of possible photographs is then sent to the setting block 36. The setting block 36 sets the number of possible photographs as the sequential photographing number in the control block 36. The control block 32 controls operations of the process block 31 and the AFE 13 based on the set sequential photographing number.

Next, two different kinds of data processing are explained below. The process block 31 carries out single-photographing or sequential-photographing data processing, depending on whether the process block 31 is controlled according to the imaging controls for single-photographing or the sequential-photographing, respectively. Changing between the data processes carried out by the process block 31 is controlled by the control block 32.

In both the single-photographing and sequential-photographing data process, a first, second, and third task are executed. In the first task, the process block 31 stores one frame of raw image data received from the AFE 13 in the DRAM 21. In the second task, the process block 31 carries out predetermined data processing, such as white balance processing, color interpolation processing, and edge enhancement processing, on one frame of the raw image data stored in the DRAM 21. The process block 31 then compresses the raw image data having undergone the predetermined data processing, and the process block 31 stores the compressed image data in the DRAM 21. In the third task, the compressed image data stored in the DRAM 21 is stored by the process block 21 in the memory card 23.

As shown in FIG. 3, in the single-photographing data process, the first, second and third tasks are executed in order for one frame of received raw image data.

As shown in FIG. 4, in the sequential-photographing data process, the first, second, and third tasks are executed overlappingly and simultaneously for a plurality of frames of successively received raw image data.

Figure 5:
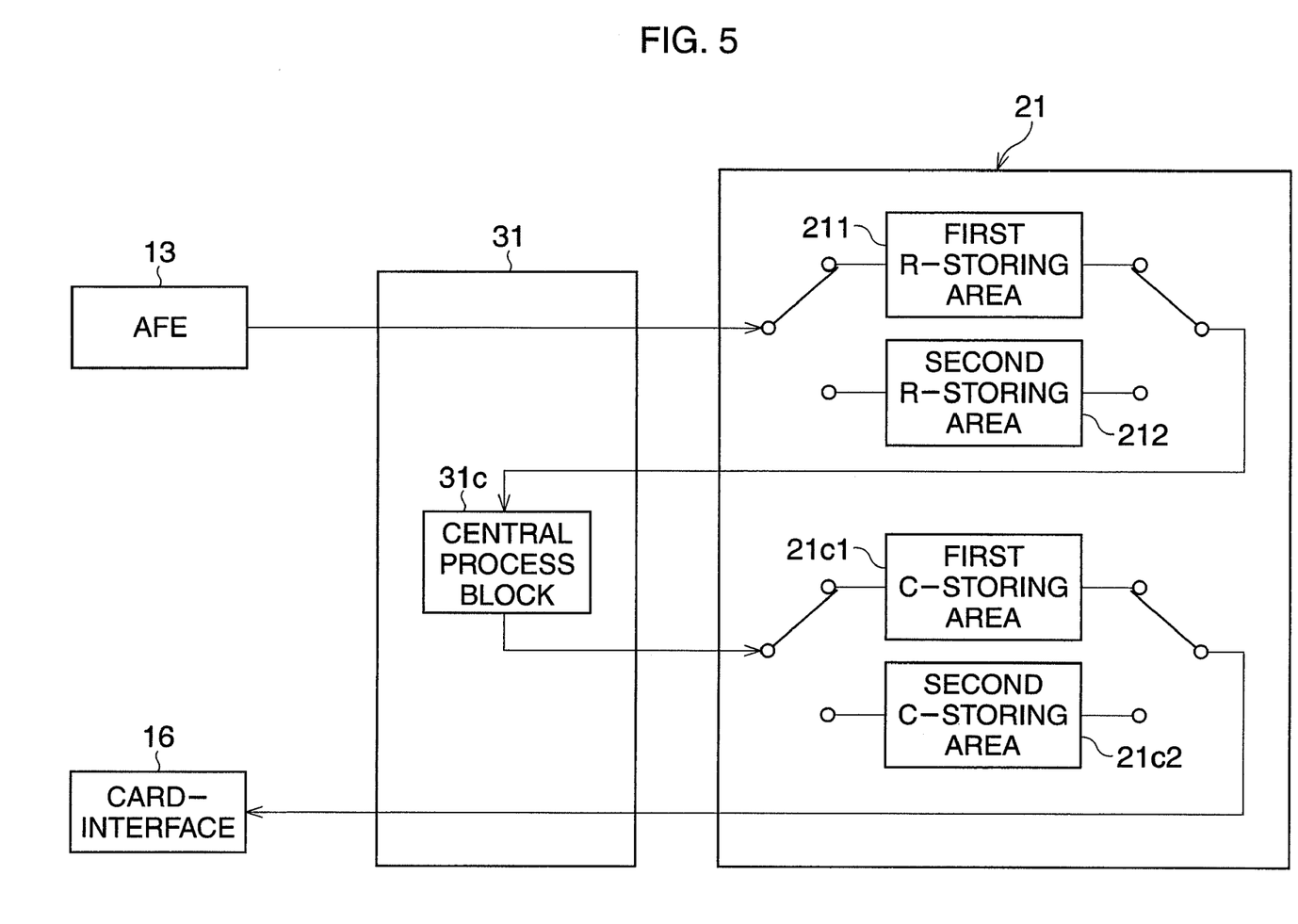
FIG. 5 is a block diagram showing the internal structure of the DRAM and the connection of the DRAM to the process block.

Next, the internal structure of the DRAM 21 is explained in greater detail below using FIG. 5. The DRAM 21 comprises a first and second restoring area 211, 212, and a first and second c-storing area 21c1, 21c2. The raw image data sent from the AFE 13 to the DSP 30 is temporarily stored in the first and second restoring areas 211, 212. The compressed image data, having undergone predetermined data processing and variable-length compression, is temporally stored in the first and second c-storing areas 21c1, 21c2.

The AFE 13 is connected to either the first or second restoring area 211, 212 via the process block 31. Incidentally, the CPU 14 controls the change of connection to either the first or second r-storing area 211, 212.

The process block 31 comprises a central process block 31c which carries out the predetermined data processing and the variable-length compression. The central process block 31c is connected to either the first or the second restoring area 21.1, 212. Incidentally, the CPU 14 controls the change of connection between the central process block 31c and either the first or second restoring area 211, 212.

Further, the central process bock 31c is connected to either the first or second c-storing area 21c1, 21c2. Incidentally, the CPU 14 controls the change of connection to either the first or second c-storing area 21c1, 21c2.

Either the first or second c-storing area 21c1, 21c2 is connected to the card-interface 16 via the process block 31. Incidentally, the CPU 14 controls the change of connection between either the first or second c-storing area 21c1, 21c2 and the card-interface 16.

Next, the imaging controls for sequential-photographing and single-photographing are explained below.

In the imaging control for single-photographing, the control block 32 controls the imaging device 12 via the AFE 13 so that the imaging device 12 generates one frame of a raw image signal. In addition, the generated raw image signal is converted into raw image data, and the raw image data is sent to the DSP 30.

In the imaging control for single-photographing, the AFE 13 and the central process block 31c are connected to the first r-storing area 211, and the central process block 32c and the card-interface 16 are connected to the first c-storing area 21c1. Incidentally, the AFE 13 and the central process block 31c may be connected to the second r-storing area 212, or the central process block 32c and the card-interface 16 may be connected to the second c-storing area 21c2.

The first task is executed by storing the raw image data sent from the AFE 13 to the DSP 30 in the first r-storing area 211 (see "t1" in FIG. 3). After finishing the first task, the second task is executed by carrying out the predetermined data processing on the raw image data, compressing the raw image data, and storing the compressed image data in the first c-storing area 21c1 (see "t2" in FIG. 3). After finishing the second task, the third task is executed by storing the compressed image data, which is stored in the first c-storing area 21c1, in the memory card 23 (see "t3" in FIG. 3). In the imaging control for single-photographing, the control block 32 controls the process block 31 so that the above first, second, and third tasks are executed in order.

In the imaging control for sequence-photographing, the control block 32 controls the imaging device 12 via the AFE 13 so that the imaging device 12 successively generates the set sequential photographing number of frames of a raw image signal. In addition, the generated raw image signals are converted into a plurality of frames of raw image data, and the plurality of frames of the raw image data are successively sent to the DSP 30.

In the imaging control for sequential-photographing, connection of the AFE 13 to either the first or second restoring area 211, 212, connection of the central process block 31c to either the first or second r-storing area 211, 212, connection of the central process block 31c to either the first or second c-storing area 21c1, 21c2, and connection of the card-interface 16 to either the first or second c-storing area 21c1, 21c2 are changed reciprocally and repeatedly. Incidentally, a cycle to change each connection is adjusted so that the cycle to change agrees with a cycle to generate each frame of image signals. Further, changing the above connections is adjusted so that the central process block 31c is connected to the first or second r-storing area 211, 212 when the AFE 13 is connected to the second or first r-storing area 212, 211, respectively. Further, changing the above connections is adjusted so that the card-interface 16 is connected to the first or second c-storing area 21c1, 21c2 when the central process block 31c is connected to the second or first c-storing area 21c2, 21c1, respectively.

The first task for a first raw image data D1 is executed by storing the first raw image data D1 sent from the AFE 13 to the DSP 30 in the first restoring area 211 at time t1 (see FIG. 4). The first task for a second raw image data D2 generated next to the first raw image data D1 is executed by storing the second raw image data D2 sent from the AFE 13 to the DSP 30 in the second r-storing area 212 at times t2 and t3 (see FIG. 4).

The second task for the first raw image data D1 is executed by carrying out the predetermined data processing on the first raw image data D1, compressing the first raw image data D1, and storing the first compressed image data D1 in the first c-storing area 21c1 at time t2 (see FIG. 4). The third task for the first compressed image data D1 is executed by storing the first compressed image data D1, stored in the first c-storing area 21c1, in the memory card 23 at time t3 (see FIG. 4).

Similarly the first task for a third raw image data D3 generated next to the second raw image data D2 is executed during execution of the second and third tasks for the second image data D2. And the first task for a fourth raw image data D4 generated next to the third raw image data D3 is executed during execution of the second and third tasks for the third image data D3. Similarly, the first task for raw image data is executed during execution of the second and third tasks for the previously generated image data.

In the imaging control for sequential-photographing, the control block 32 controls the process block 31 so that the above first, second, and third tasks are executed simultaneously.

When the release button is depressed fully in the single-photographing mode, the imaging device 12 and the process block 31 are controlled according to the imaging control for single photographing. On the other hand, when the release button is fully-depressed in the sequence-photographing mode, the imaging device 12 and the process block 31c are controlled according to the imaging controls for sequential-photographing and single-photographing. Incidentally, the imaging device 12 and the process block 31c are controlled according to the imaging control for sequential-photographing so that as many photographs as possible can be taken. When it is impossible to take a photograph under the imaging control for sequential-photographing, the control is automatically changed to the imaging control for single-photographing, as described later.

When the control is changed from the imaging control for sequential-photographing to the imaging control for single-photographing in the sequence-photographing mode, the imaging control for single-photographing is started after the last frame of the compressed image data under the imaging control for sequential-photographing has been stored in the memory card 23. Accordingly, next frame of a raw image signal is generated at the same time as the last frame of the compressed image data under the imaging control for sequential-photographing, and the next frame of the raw image data corresponding to the next frame of the raw image signal is stored in the DRAM 21 under the imaging control for single-photographing.

Figure 6:
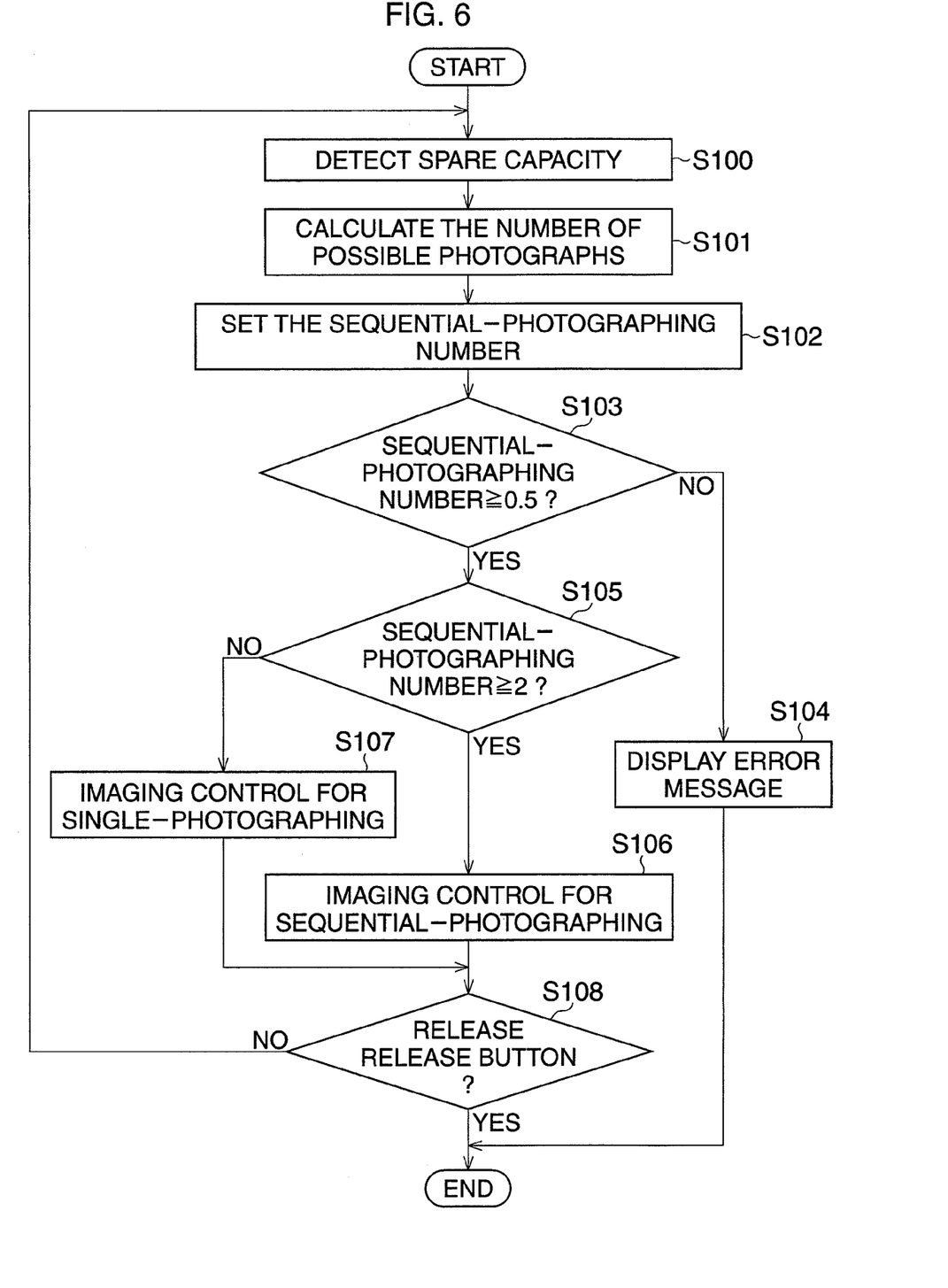
FIG. 6 is a flowchart explaining various operations in the sequence-photograph mode carried out by the CPU and the DSP.
Figure 7:
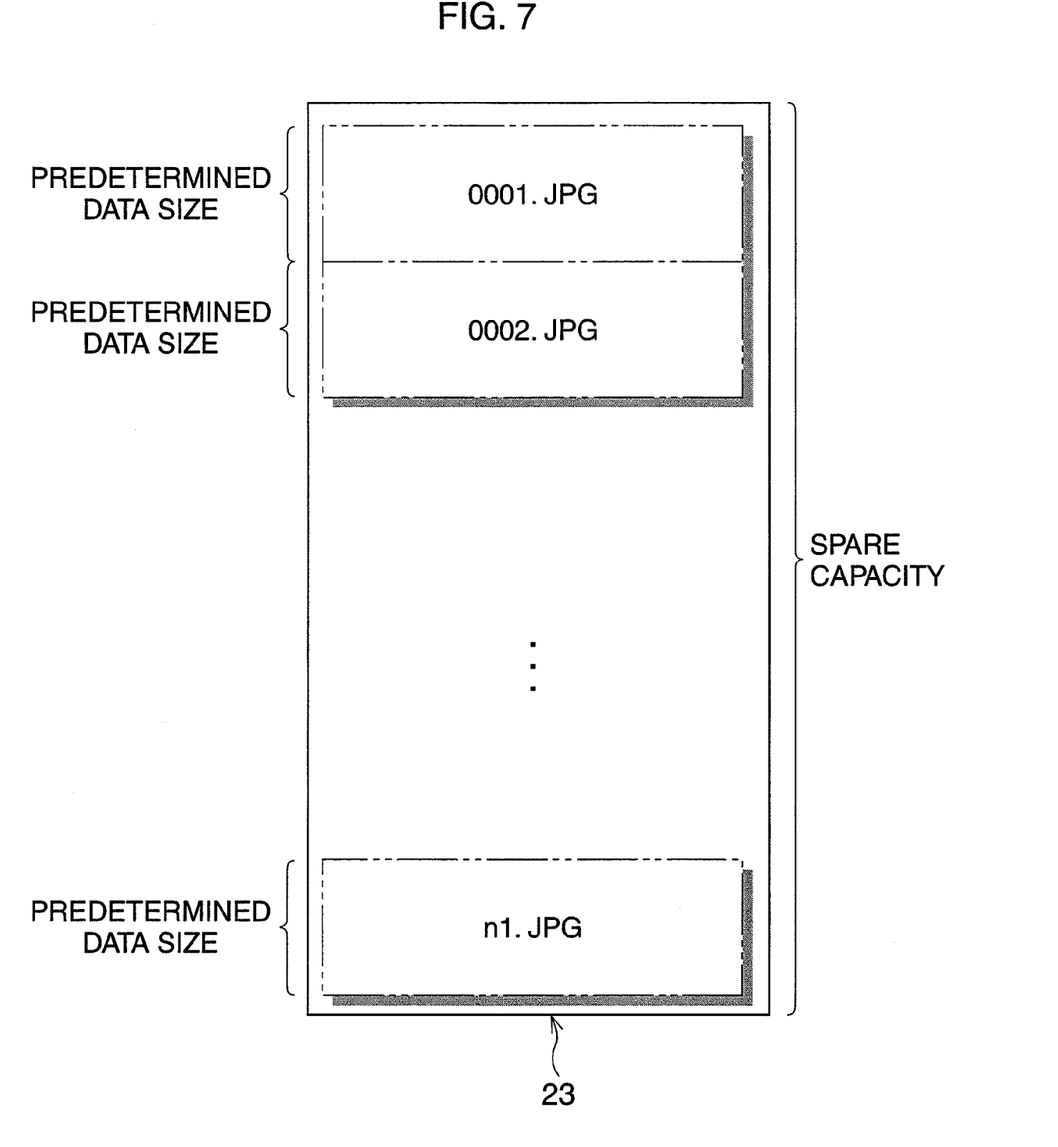
FIG. 7 is a first data structural diagram conceptually showing the storage status of the compressed image data in the memory card.
Figure 8:
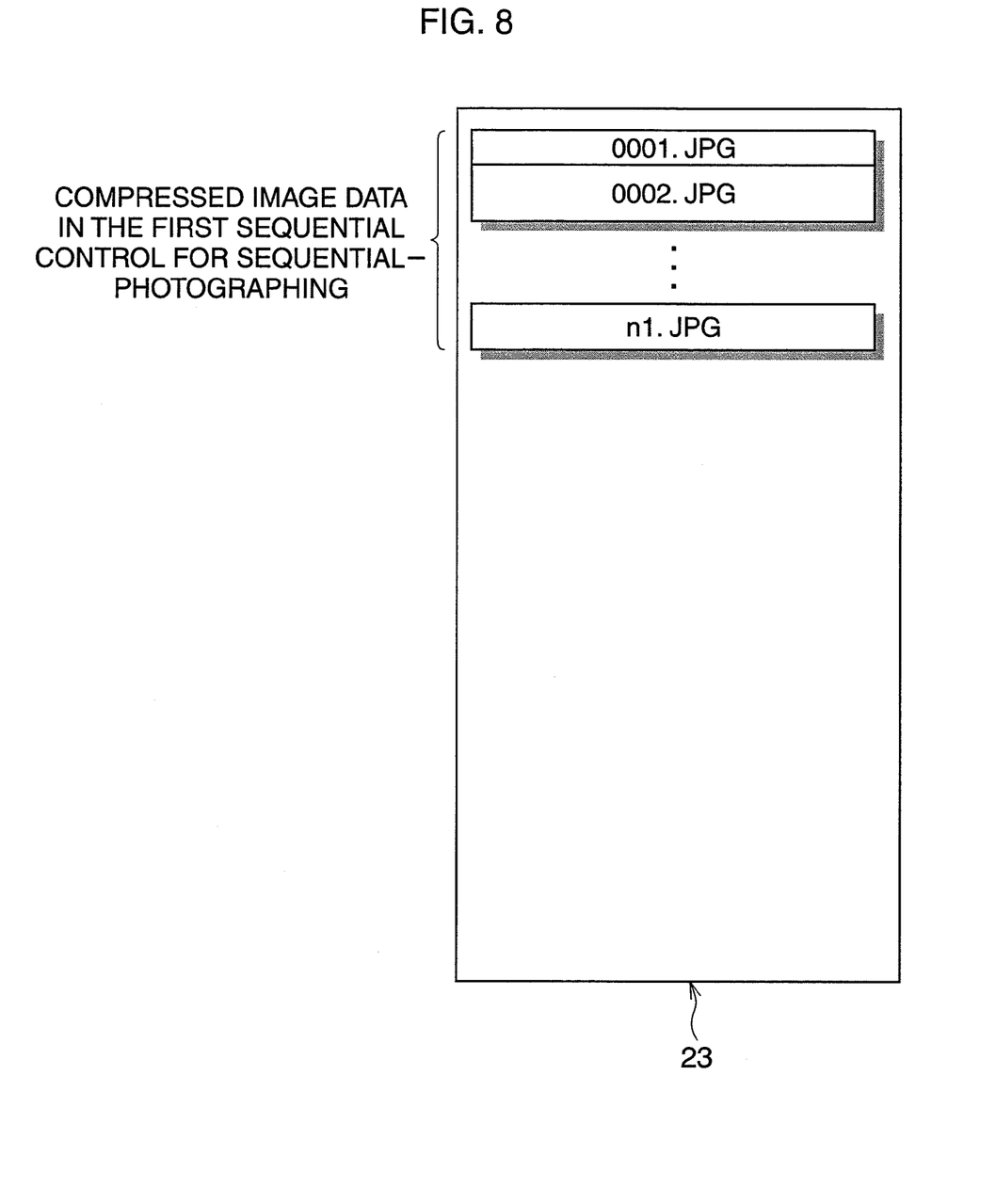
FIG. 8 is a second data structural diagram conceptually showing the storage status of the compressed image data in the memory card.
Figure 9:
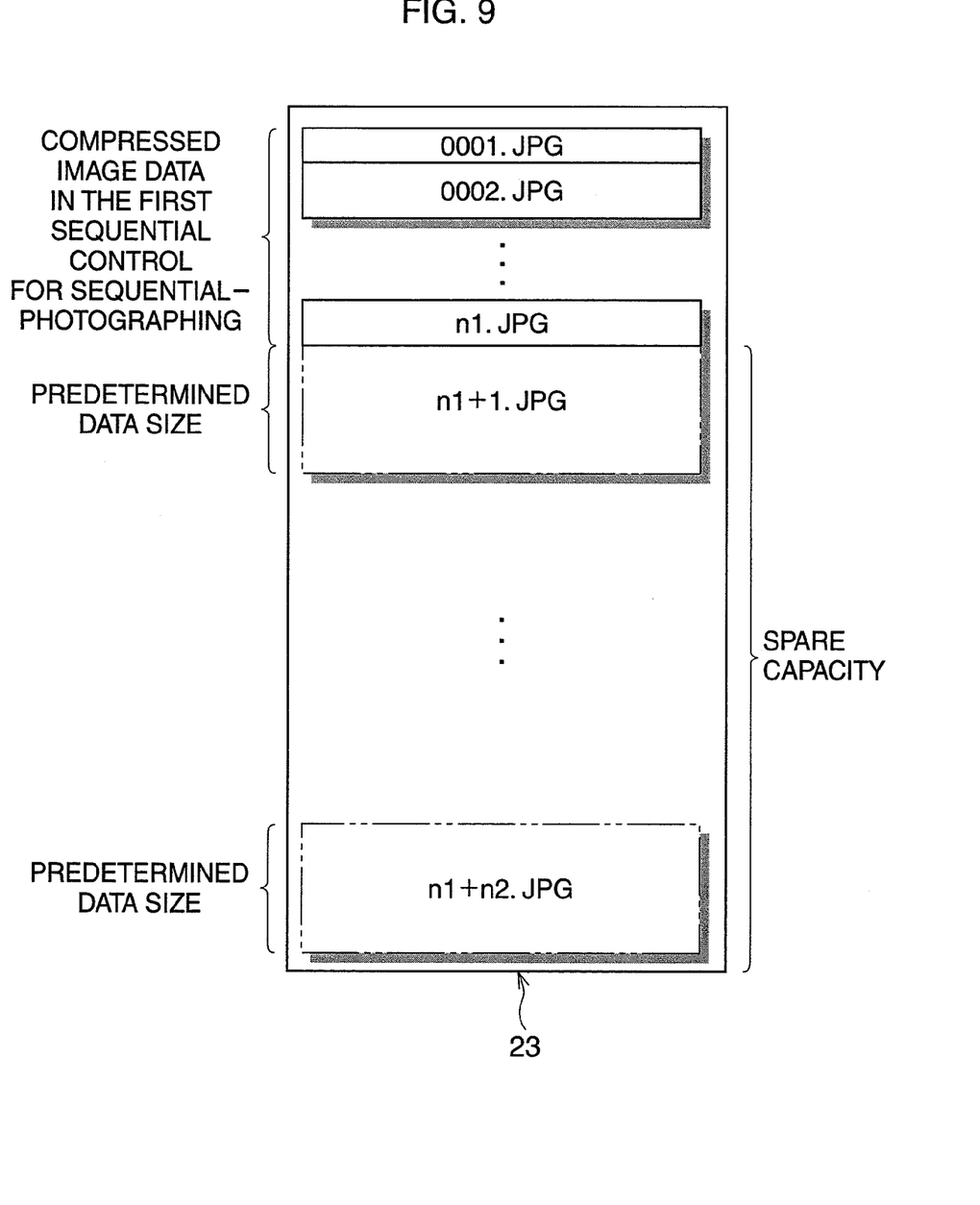
FIG. 9 is a third data structural diagram conceptually showing the storage status of the compressed image data in the memory card.
Figure 10:
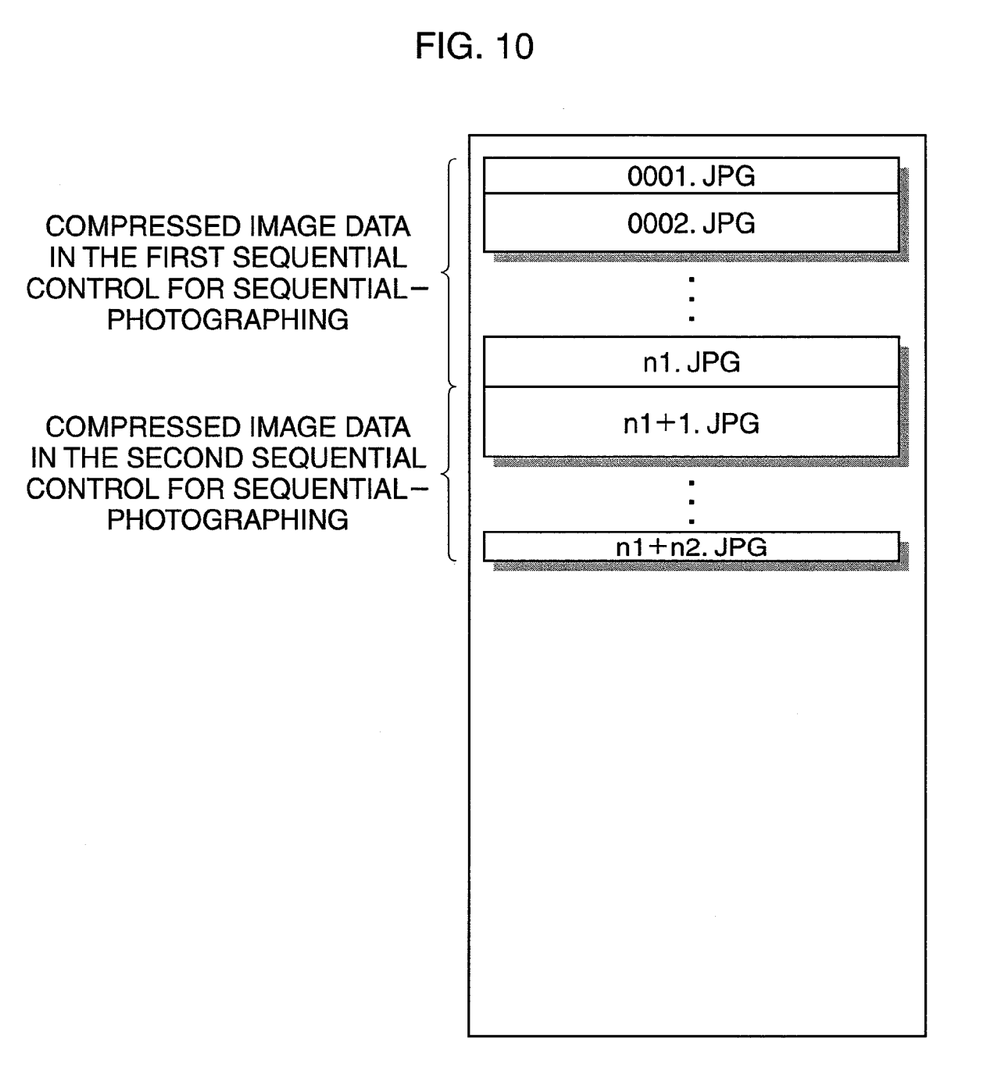
FIG. 10 is a fourth data structural diagram conceptually showing the storage status of the compressed image data in the memory card.

Next, the process that the CPU 14 and the DSP 30 carry out for sequence photography in the sequence-photographing mode is explained using the flowchart of FIG. 6. The process starts when the release button is fully-depressed in the sequence-photographing mode.

At step S100, the detection block 33 detects the amount of spare capacity of the memory card 23. After detection, the process proceeds to step S101.

At step S101, the calculation block 34 divides the spare capacity detected at step S100 by the predetermined data size read from the ROM 35. Then the number of possible photographs is calculated. After calculation of the number of possible photographs, the process proceeds to step S102.

At step S102, the setting block 34 sets the number of possible photographs to the sequential-photographing number. After the number has been set, the process proceeds to step S103.

At step S103, the control block 32 determines whether or not the set sequential-photographing number is greater than a second predetermined number. Incidentally, 0.5 is the second predetermined number in this embodiment.

When it is determined at step S103 that the set sequential-photographing number is less than the second predetermined number, the process proceeds to step S104. At step S104, an error message such as "impossible to photograph" is displayed on the monitor 22. After the message is displayed, the process for automatic sequence photography is complete.

On the other hand, when it is determined at step S103 that the set sequential-photographing number is greater than the second predetermined number, the process proceeds to step S105. At step S105, the control block 32 compares the set sequential-photographing number with a first predetermined number and determines whether or not the set sequential-photographing number is greater than the first predetermined number. Incidentally, 2 is the first predetermined number in this embodiment.

When the set sequential-photographing number is greater than 2, the process proceeds to step S106. At step S106, the control block 32 carries out the imaging control for sequential-photographing so that the set sequential-photographing number of sequential photographs are taken as long as the release button remains fully depressed. Consequently, the imaging device 12 is ordered to generate the set sequential-photographing number of frames of an image signal, and the process block 31 is ordered to carry out the sequential-photographing data process. In addition to the imaging control for sequential-photographing, the image data, after having undergone the sequential-photographing data processing, is compressed according to the variable-length compression, and is then stored in the memory card 23.

On the other hand, when the set sequential-photographing number is less than 2, the process proceeds to step S107. At step S107, the control block 32 carries out the imaging control for single-photographing. Consequently, the imaging device 12 is ordered to generate one frame of an image signal, and the process block 31 is ordered to carry out the single-photographing data process. In addition to the imaging control for single-photographing, the image data, after having undergone the single-photographing data processing, is compressed according to the variable-length compression, and is stored in the memory card 23.

After steps S106 or S107, the process proceeds to step S108. At step S108, it is determined whether or not a command for sequence photography is discontinued by a user releasing the release button.

When the command for sequence photography is not discontinued, the process returns to step S100. At that point, the sequential control for sequential-photographing to carry out steps S100~S103, S105, S106, and S108 in order, or the sequential control for single-photographing to carry out steps S100~S103, S105, S107, and S108 in order are repeated until the command input is no longer detected. Accordingly, the sequential control for sequential-photographing and the sequential control for single-photographing are repeated until the set sequential-photographing number is less than 0.5, as long as the release button remains fully depressed. When the command for sequence photography is discontinued, the process for automatic sequence photography is complete.

The sequence photography continues while the release button is depressed in the sequence-photographing mode until the spare capacity of the memory card 23 is depleted. The spare capacity of the memory card 23, the number of possible photographs, and the storage operation of the compressed image data in the memory card 23 are explained below with reference to FIGS. 7~11.

FIGS. 7~11 conceptually show the storage status of the compressed image data in the memory card 23. Incidentally, the predetermined data size for calculation of the number of possible photographs is represented using a dashed double-dotted line, and the actual data size of the compressed image data is represented with a solid line in FIGS. 7~11.

When the sequence photography starts in sequence-photographing mode, the first sequential control for sequential-photographing is carried out. In the first sequential control of sequential-photographing, the number "n1" ("n1" is a natural number greater than two) represents the number of possible photographs and is calculated by dividing the detected spare capacity of the memory card 23 by the predetermined data size read from the ROM 35 (see FIG. 7). After the calculation of "n1" in the first sequential control for sequential-photographing, the image data is compressed according to the variable-length compression and is stored in the memory card 23 (see FIG. 8).

After the first sequential control for sequential-photographing, the second sequential control for sequential-photographing is carried out as long as the release button remains fully depressed. In the second sequential control of sequential-photographing, the amount of spare capacity of the memory card 23 is detected after storing the compressed image data in the first sequential control for sequential-photographing (see FIG. 9). The number "n2" ("n2" is a natural number greater than two) represents the number of possible photographs and is calculated by dividing the detected spare capacity of the memory card 23 by the predetermined data size read from the ROM 35 (see FIG. 9) similarly to the first sequential control for sequential-photographing. After the calculation of "n2" in the second sequential control for sequential-photographing, the image data is compressed according to the variable-length compression and is stored in the memory card 23 (see FIG. 10).

Similarly, the third ~ the sth sequential control for sequential-photographing is carried out as long as the release button remains fully depressed. After the sth sequential control for sequential-photographing, the (s+1)st sequential control for sequential-photographing is initiated. In the (s+1)st sequential control for sequential-photographing, the number "n(s+1)" ("n(s+1)" ranges between one and two) represents the number of possible photographs and is calculated by dividing the detected spare capacity of the memory card 23 by the predetermined data size read from the ROM 35 (see FIG. 11). At this point, the sequential control for sequential-photographing is terminated because the number "n(s+1)" is less than 2.

Figure 11:
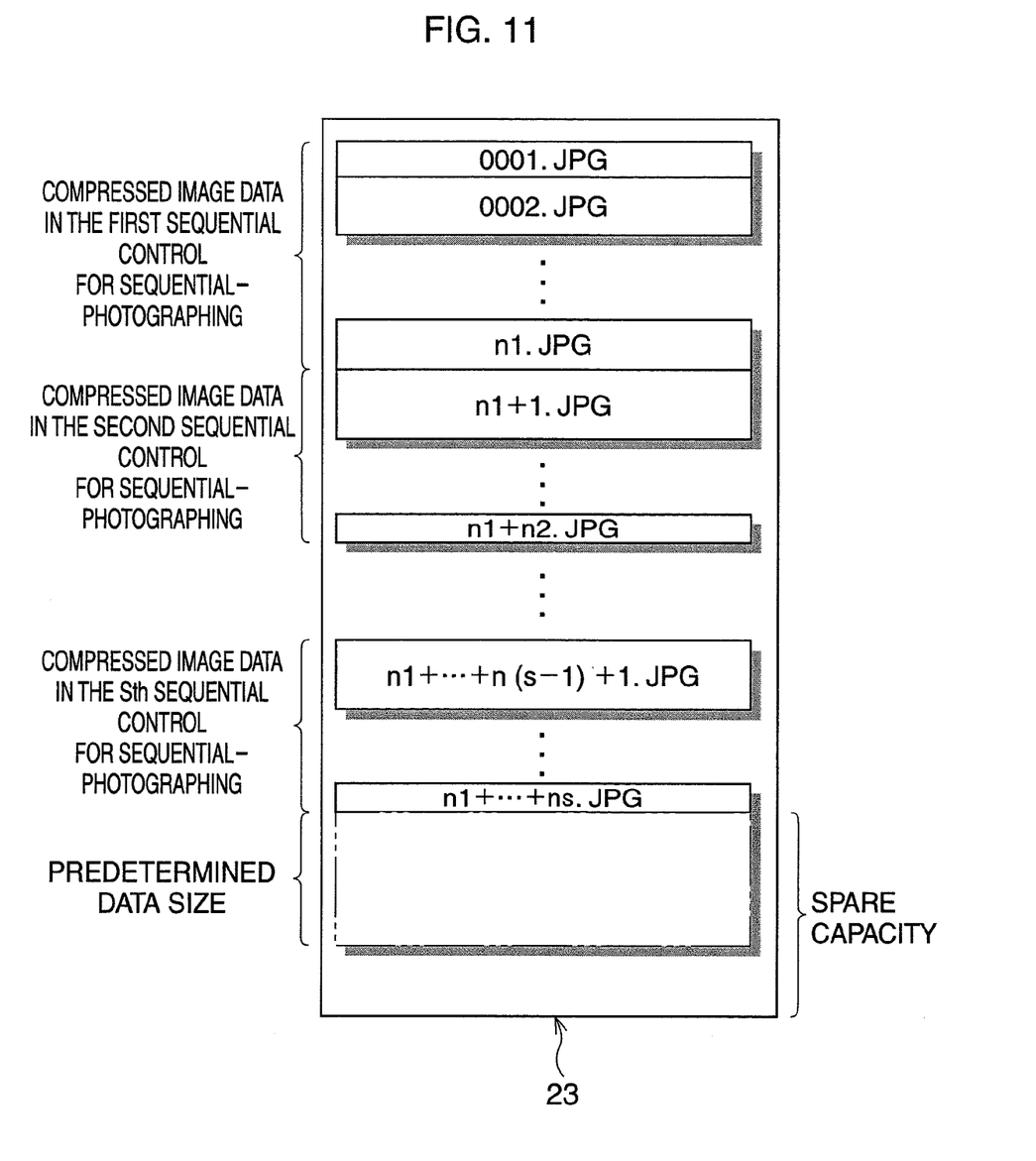
FIG. 11 is a fifth data structural diagram conceptually showing the storage status of the compressed image data in the memory card.

After terminating the sequential control for sequential-photographing, the sequential control for single-photographing is initiated as long as the release button remains fully depressed. The sequential control for single-photographing is then carried out repeatedly until the number of possible photographs follows below the second predetermined number.

In the above embodiment, it is possible to take enough sequence photographs to use up the memory card by repeating the sequential control for sequential-photographing. Further, lowering the image quality is prevented because the compression ratio is not adjusted to a higher level than necessary.

Further, in the above embodiment, it is possible to stop sequence photography by releasing the release button.

Further, in the above embodiment, generating an image signal that cannot be stored can be prevented because the sequential control for sequential-photographing stops if the memory card 23 does not have an enough spare capacity. In addition, the memory card can be used up even if the sequential control for sequential-photographing is terminated because the sequential control for single-photographing starts immediately after the sequential control for single-photographing has been stopped. In addition, the memory card can be used up by repeating the sequential control for single-photographing.

The sequential control for single-photographing is repeated until the set sequential-photographing number is less than the second predetermined number in the above embodiment. However, the sequential control for single-photographing may not be repeated. The memory card can be used only by carrying out one cycle of the sequential control for single-photographing after terminating the sequential control for sequential-photographing.

The detection of the spare capacity of the memory card 23, the calculation of the number of possible photographs, the setting of the sequential-photographing number, and the determination whether or not the set sequential-photographing number is greater than 2, may not be carried out. Similar effect of the above embodiment is achieved even if these operations are not carried out in the sequential control for single-photographing.

Both the sequential controls for sequential-photographing and single-photographing terminate when the release button is released in the above embodiment. However the sequential controls may not stop at that point. Using up the memory card can be achieved even if the sequential controls do not stop. Of course, it is preferable for reasons of convenience to stop the sequential controls by releasing the release button.

The first predetermined number is decided to be 2 in the above embodiment. However, the first predetermined number may be decided to be any number. The larger the first predetermined number is decided to be, the less times the sequential control for sequential-photographing is repeated. Consequently, the memory card may not be used enough when the sequential control for sequential-photographing is terminated. On the other hand, the smaller the first predetermined number, the more often the storage of compressed image data in the memory card 23 fails. Taking all of this into consideration, it is preferable to select 2 as the first predetermined number.

The second predetermined number is decided to be 0.5 in the above embodiment. However, the second predetermined number may be any number as long as the second predetermined number is less than the first predetermined number. The larger the second predetermined number, the more spare capacity remains in the memory card 32 after completion of sequential photography. On the other hand, the smaller the second predetermined number, the more often the storage of compressed image data in the memory card 23 fails.

The predetermined data size is the estimated average data size of one frame of compressed image data generated when a photograph of a general object is taken under general conditions in the above embodiment. However, the predetermined data size is set according to a user's requirement. By enlarging the predetermined data size, it increases the possibility of storing the compressed image data in the memory card 23 without failure. On the other hand, the smaller the predetermined data size, the greater the number of frames of the compressed image data to be stored in the memory card.

The imaging device 12 generates one frame of an image signal in the above embodiment. However, the image signal 12 may generate one field of an image signal.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-045179 (filed on Feb. 22, 2006), which is expressly incorporated herein, by reference, in its entirety.

The invention claimed is:

1. An imaging apparatus control unit, comprising:
a first detection block that detects the spare capacity of a memory, said memory storing an image signal that is generated by an imaging device when capturing an optical image of an object;
a calculation block that calculates the number of possible photographs based on said spare capacity and a predetermined data size;
a setting block that sets said number of possible photographs as the sequential-photographing number;
a first control block that performs imaging control for either sequential-photographing or single-photographing so that said set sequential-photographing number of photographs or a single photograph is taken, respectively;
a work memory that comprises first and second storage areas each able to store a frame of an image signal generated in said imaging control either for sequential-photographing or single-photographing;
a compression block that generates a compressed image signal by compressing said image signal stored in said work memory according to a variable-length compression;
an output block that outputs said compressed image signal to said memory;
a control block that performs an image signal handling operation for sequential-photographing, in which said work memory, said compression block, and said output block are controlled to: alternately store consecutive frames of the image signals in said first and second storage areas; and compress said frame of the image signal stored in one of said first and second storage areas and output said compressed image signal during storing of a new frame of image signal in another of said first and second storage areas;
a second control block that performs sequential control for sequential-photographing or sequential control for single-photographing, with said first detection block, said calculation block, said setting block, said first control block, and said control block being sequentially controlled to detect said spare capacity, to calculate said number of possible photographs, to set said number of possible photographs as said sequential-photographing number, to perform said imaging control for sequential-photographing, and to perform said image signal handling operation for sequential-photographing, respectively, during said sequential control for sequential-photographing; and with said first control block, said compression block, and said output block being sequentially controlled to perform said imaging control for single-photographing, to generate said compressed image signal, and to output said compressed image signal, respectively, during said sequential control for single-photographing;
a comparison block that compares said sequential-photographing number, which is calculated in said sequential control for sequential-photographing, to a first predetermined number; and
a second detection block that detects whether or not a command for sequence photography is input; and
said second control block repeatedly performing said sequential control for sequential-photographing while said second detection block detects said command for sequence photography; and
said second control block terminating said sequential control for sequential-photographing and initiating said sequential control for single-photographing when said sequential-photographing number is below said first predetermined number.

2. An imaging apparatus control unit according to claim 1, wherein said second control block repeatedly performs said sequential control for single-photographing after initially performing said sequential control for single-photographing.

3. An imaging apparatus control unit according to claim 1, wherein said second control block terminates said sequential control for single-photographing when said command for sequence photography is discontinued.

4. An imaging apparatus control unit according to claim 1, wherein said second control block terminates performing said sequential control for single-photographing if said number of possible photographs calculated before carrying out said sequential control for single-photographing is below a second predetermined number.

5. The image apparatus control unit according to claim 1, wherein a cycle of switching between the first storage area and the second storage area for storing the frame of the image signal into the work memory is the same as a cycle of switching the first storage area and the second storage area for reading the frame of the image signal from the work memory to be compressed and output.

6. An imaging apparatus control unit, comprising:
a first control block that controls an imaging device to capture an optical image of an object, to generate a frame of an image signal upon capture of said optical image, and to store the frame of the image signal to a work memory including first and second storage areas;
a signal processing block that performs predetermined signal processing, in which a compressed image signal is generated from said frame of image signal stored in the work memory by compressing the frame according to a variable-length compression;
a second control block that stores said compressed image signal in a memory; and
a third control block that performs sequential control for either single-photographing or sequential-photographing, with said first control block, said signal processing block, and said second control block being controlled so that generation of said frame of the image signal, predetermined signal processing on said frame of the image signal, and storage of said compressed image signal in said memory are sequentially performed, in order, in said sequential control for single-photographing; and with said first control block, said signal processing block, and said second control block being controlled to alternately store consecutive frames of image signals into the first and second storage areas, to perform the predetermined signal processing on said frame of image signal previously stored in one of the first and second storage areas and output the compressed image signal to the memory while a succeeding frame of image signal is stored in another of the first and second storage areas in said sequential control for sequential-photographing; and
a detection block that detects the spare capacity of said memory; and
said third control block performing said sequential control for sequential-photographing, and initiating said sequential control for single-photographing when the detected spare capacity is less than a predetermined value.

7. The image apparatus control unit according to claim 6, wherein a cycle of switching between the first storage area and the second storage area for storing the frame of the image signal into the work memory is the same as a cycle of switching the first storage area and the second storage area for reading the frame of the image signal from the work memory to be compressed and output.

8. A digital camera, comprising:
an imaging device that generates an image signal when capturing an optical image of an object;
a memory that stores said image signal;
a first detection block that detects the spare capacity of said memory;
a calculation block that calculates the number of possible photographs based on said spare capacity and a predetermined data size;
a setting block that sets said number of possible photographs as the sequential-photographing number;
a first control block that performs imaging control for either sequential-photographing or single-photographing so that said set sequential-photographing number of photographs or one single photograph is taken, respectively;
a work memory that comprises first and second storage areas each able to store a frame of an image signal generated in said imaging control either for sequential photographing or single-photographing;
a compression block that generates a compressed image signal by compressing said image signal stored in said work memory according to a variable-length compression;
a control block that performs an image signal handling operation for sequential-photographing, in which said work memory, said compression block and said memory are controlled to: alternately store consecutive frames of image signals in one of said first and second storage areas; and compress the frame stored in one of the first and second storage areas and output said compressed frame of image signal into the memory during storing of a new frame of image signal in another of the first and second storage areas;
a second control block that performs sequential control for sequential-photographing or sequential control for single-photographing, with said first detection block, said calculation block, said setting block, said first control block, and said control block being sequentially controlled to detect said spare capacity, to calculate said number of possible photographs, to set said number of possible photographs as said sequential-photographing number, to perform said imaging control for sequential-photographing, and to perform said image signal handling operation for sequential-photographing, respectively, in said sequential control for sequential-photographing; and with said first control block, said compression block, and said memory being sequentially controlled to perform said imaging control for single-photographing, to generate said compressed image signal by compressing said image signal, and to store said compressed image signal, respectively, in said sequential control for single-photographing;
a comparison block that compares said sequential-photographing number, which is calculated in said sequential control for sequential-photographing, to a first predetermined number; and
a second detection block that detects whether or not a command for sequence photography is input; and
said second control block repeatedly performing said sequential control for sequential-photographing while said second detection block detects said command for sequence photography; and
said second control block terminating said sequential control for sequential-photographing and initiating said sequential control for single-photographing when said sequential-photographing number is below said first predetermined number.

9. The image apparatus control unit according to claim 8, wherein a cycle of switching between the first storage area and the second storage area for storing the frame of the image signal into the work memory is the same as a cycle of switching the first storage area and the second storage area for reading the frame of the image signal from the work memory to be compressed and output.

* * * * *